United States Patent
Fredinburg et al.

(10) Patent No.: US 8,977,741 B1
(45) Date of Patent: Mar. 10, 2015

(54) METHOD AND SYSTEM FOR CLOUD COMPUTING SERVICE TRANSPARENCY

(75) Inventors: Dan Fredinburg, San Francisco, CA (US); Jaideep Mirchandani, Huderabad (IN)

(73) Assignee: Google Inc., Mountain View, CA (US)

( * ) Notice: Subject to any disclaimer, the term of this patent is extended or adjusted under 35 U.S.C. 154(b) by 564 days.

(21) Appl. No.: 13/408,614

(22) Filed: Feb. 29, 2012

(51) Int. Cl.
*G06F 15/173* (2006.01)
*G06F 9/50* (2006.01)
*H04L 29/08* (2006.01)

(52) U.S. Cl.
CPC ............... *G06F 9/5061* (2013.01); *H04L 67/18* (2013.01)
USPC ........... 709/224; 709/220; 709/221; 709/226; 707/E17.045; 707/745

(58) Field of Classification Search
CPC .. G06F 9/5061; G06F 17/30528; H04L 67/18
USPC ........................................................ 709/224
See application file for complete search history.

(56) References Cited

U.S. PATENT DOCUMENTS

| | | | |
|---|---|---|---|
| 2011/0131499 A1* | 6/2011 | Ferris et al. | 715/736 |
| 2011/0219434 A1* | 9/2011 | Betz et al. | 726/5 |
| 2012/0130874 A1* | 5/2012 | Mane et al. | 705/34 |
| 2012/0167180 A1* | 6/2012 | Lee et al. | 726/4 |
| 2012/0179646 A1* | 7/2012 | Hinton et al. | 707/607 |
| 2013/0004935 A1* | 1/2013 | Smith et al. | 434/365 |
| 2013/0103827 A1* | 4/2013 | Dunlap et al. | 709/224 |

* cited by examiner

*Primary Examiner* — Arvin Eskandarnia
(74) *Attorney, Agent, or Firm* — Fish & Richardson P.C.

(57) ABSTRACT

A cloud computing service stores customer data on a server that is located outside of a network security system of the customer. The cloud computing service automatically monitors the customer data to identify one or more access events that originate from a resource within the cloud computing service. For each access event, the service identifies a resource and a data set. The resource may include an identifier associated with a human operator or a software application that performed the access event, and the data set may include customer data that the resource accessed during the access event. The service may create a report of each access event and the information corresponding to the data set for each access event, and it may cause the report to be transmitted to the customer.

20 Claims, 3 Drawing Sheets

METHOD AND SYSTEM FOR CLOUD COMPUTING SERVICE TRANSPARENCY

TECHNICAL FIELD

The subject matter described herein relates to the use of data residing in a cloud computing service, and to the reporting of information using such data.

BACKGROUND

Data storage facilities, such as cloud-based storage services, store customer data on a server which is located at a facility that is remote from the locations of the customer. Customers of data storage facilities demand that their data be stored in a secure manner. Customers also desire assurances that unauthorized people or services are not accessing their data.

This document describes methods and systems that are directed to addressing some of the problems described above, and/or other problems.

SUMMARY

In an embodiment, a cloud computing service stores customer data on a server that is located outside of a network security system of the customer. The cloud computing service provider automatically monitors the customer data to identify one or more access events that originate from a resource within the cloud computing service. For each access event, the service identifies a resource and a data set. The resource includes an identifier associated with a human operator or a software application that performed the access event, and the data set includes customer data that the resource accessed during the access event. The service creates a report of each access event and the information corresponding to the data set for each access event, and also causes the report to be transmitted to the customer. The service also may periodically generate updated reports and cause the updated reports to be transmitted to the customer.

In some embodiments, the service also may identify a time stamp for each access event, and include the identified time stamps in the report while ensuring that the identified resource for each access event is not identified in the report. In additional embodiments, the service also may identify a portion of the data set which is subject to a reporting restriction, replace the identified portion of the data set with a proxy, including the proxy in the report, and ensure that the portion of the data set that is subject to the reporting restriction is not included in the report.

In some embodiments, when creating the report, the service may determine categories for the data set corresponding to each access event and group the access events that share a common category in the report. For each resource having an identifier that corresponds to a human operator, the service may assign an anonymous identifier to the human operator, determine whether the anonymous identifier corresponds to any other known identifier for the human operator (and if so modify the anonymous identifier), and in the report refer to the human operator only by the anonymous identifier. In other embodiments, when creating the report, for each resource having an identifier that corresponds to a human operator the service may determine a job category for the human operator, and in the report refer to the human operator by the job category instead of any personally identifying information.

In some embodiments, the service may determine an access reason for each access event. If so, the service may include each determined reason in the report. The service also may determine the information corresponding to the data set for each access event, such that the information includes an identification of what was accessed, a time stamp, and a unique reference identifier. The information also may include one or more of the following: an indication of how the data set was accessed; a location from which the access request originated; or a job category for a person who initiated the access request.

Any or all of the steps described above may be implemented by a system that includes a management server, a storage facility, and a set of resources that are affiliated with the management server. The management server may include a processor and a memory containing computer-readable programming instructions that, when executed, cause the management server to implement any or all of the steps described above.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this document, an "electronic device" refers to a device that includes a processor and tangible, computer-readable memory. The memory may contain programming instructions that, when executed by the processor, cause the device to perform one or more operations according to the programming instructions. Examples of electronic devices include servers, personal computers, gaming systems, televisions, and portable electronic devices such as smartphones, personal digital assistants, cameras, tablet computers, laptop computers, media players and the like.

A "cloud computing service" or a "hosted storage service" refers to one or more devices that store client data at a facility that is remote from the location of a client device. The client data may include application data, data files, programming instructions, and/or other data.

A "datastore" is a tangible, computer-readable memory device, or a group of such devices, within a hosted storage service.

A For the purposes of this document, a "resource" means a person, service or software application of a cloud computing service.

Figure 1:
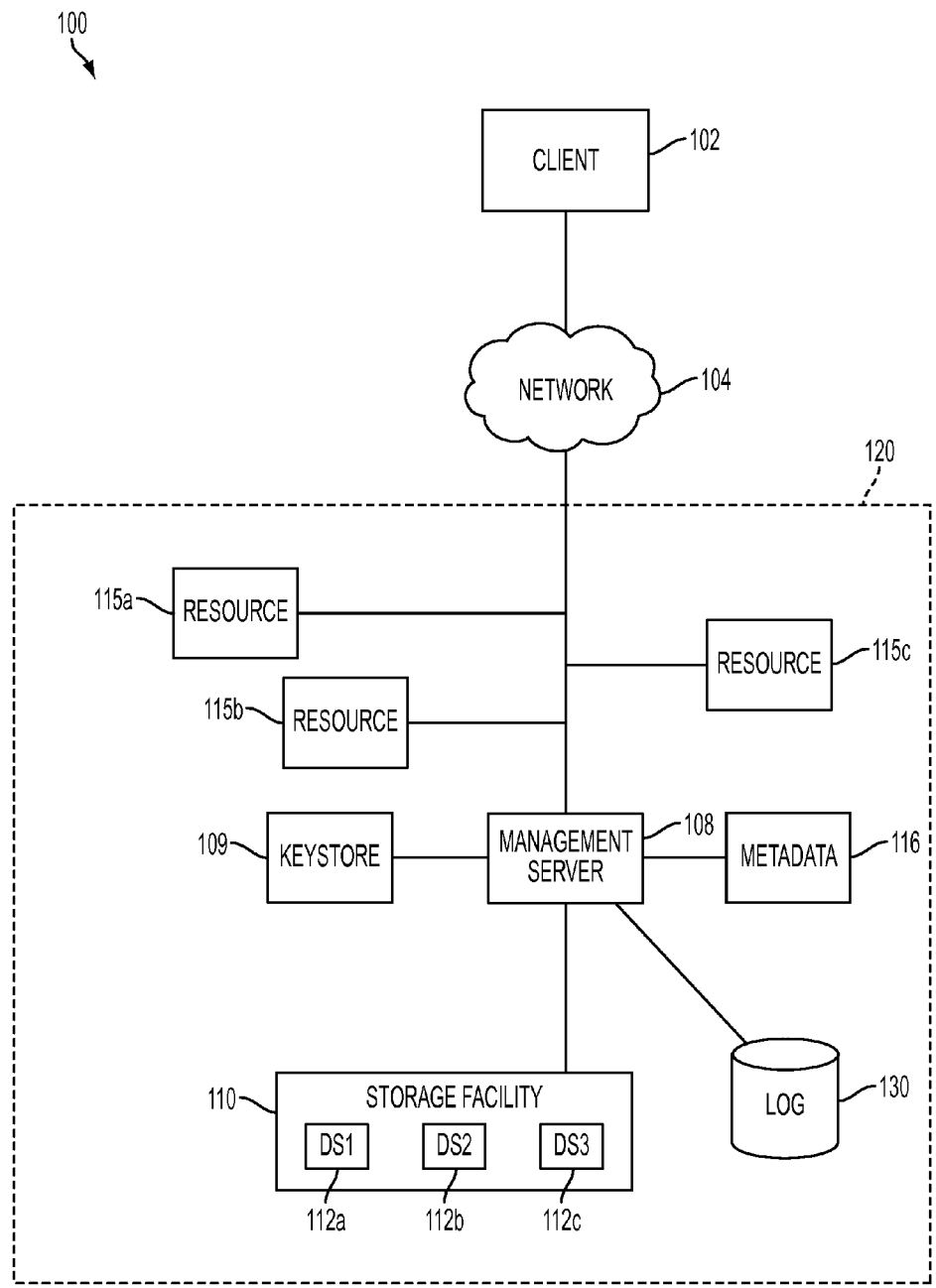
FIG. 1 depicts an example of various elements of a cloud storage service.

FIG. 1 illustrates a system 100 for transferring information between a client electronic device 102 and a hosted storage service 120. In an embodiment, one or more client electronic devices 102 may be connected to one or more communication networks 104. In an embodiment, client electronic device 102 may include a tangible, computer-readable memory on which is stored a client application.

The communication network 104 is connected to a hosted storage service 120. The hosted storage service 120 stores data in one or more storage facilities 110, which are data servers that include a tangible, computer-readable memory to store data. Any of the storage facilities 110 may be scalable by including two or more individual datastores 112a-112c. The datastores may serve as backups to each other, or they may be taken on or offline to create a larger or smaller overall storage facility depending on demand.

In various embodiments, the communication network 104 may be a local area network (LAN), a wide area network (WAN), a mobile or cellular communication network, an extranet, an intranet, the Internet and/or the like. The client device 102 may communicate with the hosted storage service 120 across the network 104 using any suitable communications protocol, such as Transmission Control Protocol/Internet Protocol (TCP/IP), Hypertext Transfer Protocol (HTTP), Secure Shell Remote Protocol (SSH), Application Program Interfaces (API), or any other suitable protocol. Although FIG. 1 only shows one client device 102, multiple client devices may communicate with the hosted storage service 120 across one or more networks 104.

When a customer sends data from the client device 102 to the hosted storage service 120 for storage in the storage facility 110, the hosted storage service's management server 108 directs the data to one or more of the datastores 112a-112c for storage. The management server 108 also may control access requests for the data after it is stored in the storage facility 110. Access may originate from external client devices or from internal resources of the hosted storage facility. The management server 108 may include one or more processors in communication with one or more computer-readable storage media. The management server 108, although depicted as a single computer system, may be implemented as multiple devices.

In an embodiment, the hosted storage service 120 includes multiple resources 115a-115c. Any or all of the resources may be software applications, such as e-mail applications, social networking applications, document generation applications, audio or video media sharing applications, audio or video media editing applications and the like. In addition, any or all of the resources may be human operators who are employed by, or service providers, to the hosted storage service. Each resource will have an associated unique identifier that allows the hosted storage service to identify the resource when the resource performs an action within the hosted storage service.

Some or all of the customer data stored in each storage facility 110 may be stored in encrypted format or unencrypted format. Data that is stored in encrypted format may be associated with one or more wrapped encryption keys that are stored alongside the data and then unwrapped by a key management facility or keystore 109, which is a tangible memory that manages the issuance of encryption keys. Any or all of the stored data also may be associated with metadata 116 that is stored on a tangible, computer-readable memory. The metadata may include information about each customer data unit, such as an identifier of the datastore where the customer data unit is held.

The management server 108 may manage customer data access requests that originate from resources within the storage facility. For example, a resource may request access to a data file by presenting a data identifier, an authentication credential, and optionally an access reason. The management server 108 may access the metadata storage and find metadata that maps the identifier to one or more of the datastores 112a-112c that store the resource. To ensure that the requester is authorized to access the data unit, the service will verify the requesting resource's authentication credential. Optionally, even if the requester is authorized, the system also may compare the requestor's access reason to one or more policies in the metadata to confirm that the requestor's access reason satisfies a policy that indicates the requester is permitted to do with the data. If the requestor is not authorized, or if the access reason is not permitted, the system will not return a data access token to the requestor and will log a record of the attempted access. If the policy is met, the system will return a data access token, which may permit the requester to access and retrieve the encrypted data and its key so that it can decrypt the customer data.

The management server 108 may create a log of activity for each data file, such as information that identifies the resource that accessed each file, a timestamp indicating the time of access, and the access reason. The management server 108 may save this information in a memory or log 130, such as a database containing a history of customer data access activity.

Figure 2:
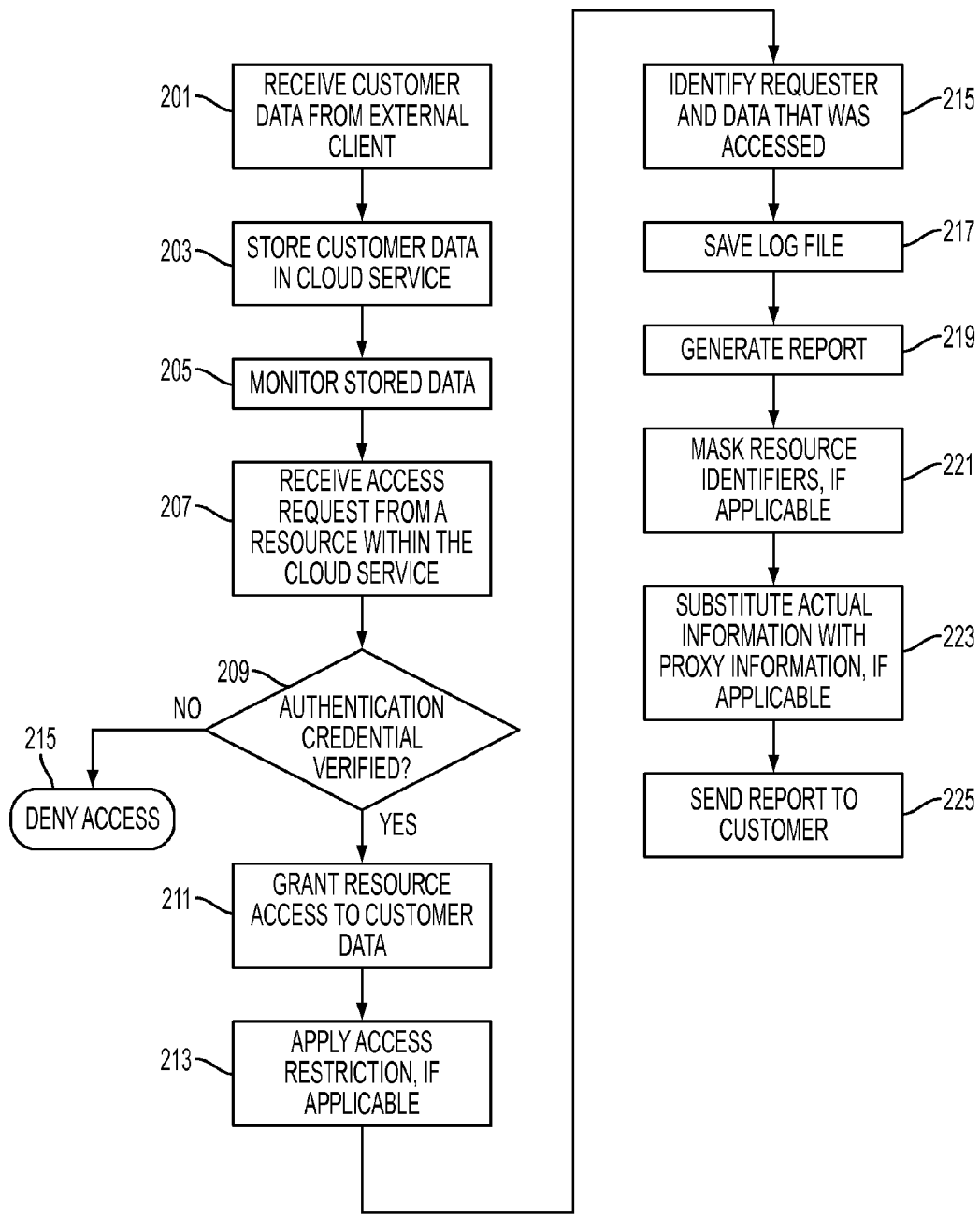
FIG. 2 depicts a process for managing access requests for data within a cloud storage service, wherein the requests originate from users or resources within the service.

FIG. 2 illustrates steps that may be followed to control multi-user access to data that is uploaded to a datastore of a cloud computing service. The cloud computing service is a service that is located outside of the networks of the clients, and in particular outside the firewall or other security system of the clients' networks. In the method, the service may receive customer data from an external client (step 201) and store the data in a storage facility of the cloud computing service (step 203). The service may then monitor the data (step 205) and identify when any access events occur (step 207). The access events may arise from access requests that the service receives from resources that are within or otherwise affiliated with the cloud computing service. Optionally, the service also may monitor access events that originate from outside the service, such as those that originate from the client itself.

The access request may include an identifier of the resource that initiated the request, an authentication credential, and optionally an access reason. The service will verify the user's authentication credential (step 209) and, if verified, will grant the resource access to the requested customer data (step 211). Granting access may include presenting the data and its related encryption key to the resource so that the customer data may be decrypted. If the authentication credential is not verified, the system may deny the resource access to the data (step 215).

If the customer data's metadata indicate that the resource's access rights may be limited, or if the resource's stated access reason corresponds to a reason which the metadata indicates requires restricted access, or if the data access token so indicates, the system may restrict the resource's access to the data (step 213). For example, the restriction may limit the resource's action to only a limited portion of the data, the restriction may permit read-only access without modification, or the restriction may place a time limit on the access so that the resource cannot access or use the data after the time limit has expired.

When access to the customer is granted, the service may identify the resource that was granted access, along with all customer data that the resource accessed during the event (step 215). The service will save this information, along with a timestamp indicating a time of access, in a log file (step 217). The timestamp may be included in any suitable format, such as MMDDYYYY HHMMSS format, where MM=month, DD=day, YYYY=year, HH=hour, MM=minutes, and SS=seconds. The timestamp also may include a time zone, such as Pacific Standard Time (PST) or Greenwich Mean Time (GMT). Optionally, individual accesses that occur within a relatively short time frame may be grouped and considered to be a single access event. For example, if the system identifies multiple accesses by a single resource within a one-minute time period, within a five-minute time period, or within a fifteen-minute time period, the service may combine these accesses into a single access event with a single timestamp when saving the information to a log file. Optionally, such combination will occur only if all accesses in the time period involve a common data set and have a common access reason. Other criteria may be used to group access events, such as if multiple access requests are associated with a single investigation or support request.

Each access event will be assigned a unique identifier that is included in the log file. The unique identifier may be any code, and in some embodiments the identifier may be the timestamp itself.

The service also may generate a report (step 219) that lists each access event and information corresponding to the data set for each access event. The report may include information such as an identifier for the resource, the data that were accessed, the time stamp for the access event, the access reason, or other information. The information identifying the data that were accessed may vary based on the data type. For example, if the datum is an e-mail message, the information may include the message's subject line, the date of the message, and/or the entire message itself. If the datum is a document, the information may include the document name, a document identifier, and a description of the section of the document that was accessed (e.g., metadata or the actual document).

Optionally, the report also may include information such as an indication of how the data set was accessed (e.g., automated or with human interaction), a location from which the access request originated (e.g., a geographic region such as a city or country), a location to which the data was transferred (e.g., a geographic region such as a city or country), and a job category for a person who initiated the access request.

The service may generate the report in response to a customer request, or it may generate the report automatically, such as at predetermined points in time, after a threshold time period has passed, or after a threshold number of access events have occurred. The report may be a document file, a media file, or other file that is transmitted to the external client for review (step 225). The report also may be transmitted to the user as an output of a user interface, such as via a customer account control panel.

Optionally, when generating the report (step 219), the service may make the report easier for the customer to understand by performing certain streamlining actions such as grouping the access events based on one or more categories. For example, the system may determine a category to which the accessed customer data belongs. Such categories may include, for example, e-mail messages, contact information, customer profile data, social network service posts, documents, photos, or other categories. The system may then group the access events so that the report presents all access events for any single category of the customer data in a common section of the report.

If the reports are periodically generated, the report generation and transmission process may be repeated at the appropriate periods, such as after a second time threshold has passed or an additional threshold number of access events have occurred.

Optionally, before sending any report to the client, the service may mask the resource's identifier so that the actual identity of the resource is not revealed in the report that is sent to the client (step 221). For example, the system may generate a keyed hash of the resource's identifier so that the actual identifier is only available to those who have the corresponding key. In such situations, the access event may be uniquely identified by its timestamp.

In addition or alternatively, certain information in the report may be subject to reporting restrictions, such as information that personally identifies a human operator or even private portions of the data set itself (such as personally identifiable information about the customer). If so, the service may replace the restricted information with proxy information (step 223). For example, if the data set includes the customer's e-mail address, the service may replace the email address with a proxy address such as "customer@proxy.com." As another example, if the resource is a human operator, the service may replace the human's name and/or job title with an anonymous identifier, such as a descriptor of the resource (e.g., mail service) and/or a general job category with which the human is affiliated. Alternatively, the anonymous identifier may be a randomly-assigned identification code. Optionally, before assigning the anonymous identifier, the system may confirm that the anonymous identifier does not yield any information that is contained in a known identifier for the human, and it does yield such information the system may assign a different identification code as the anonymous identifier.

Figure 3:
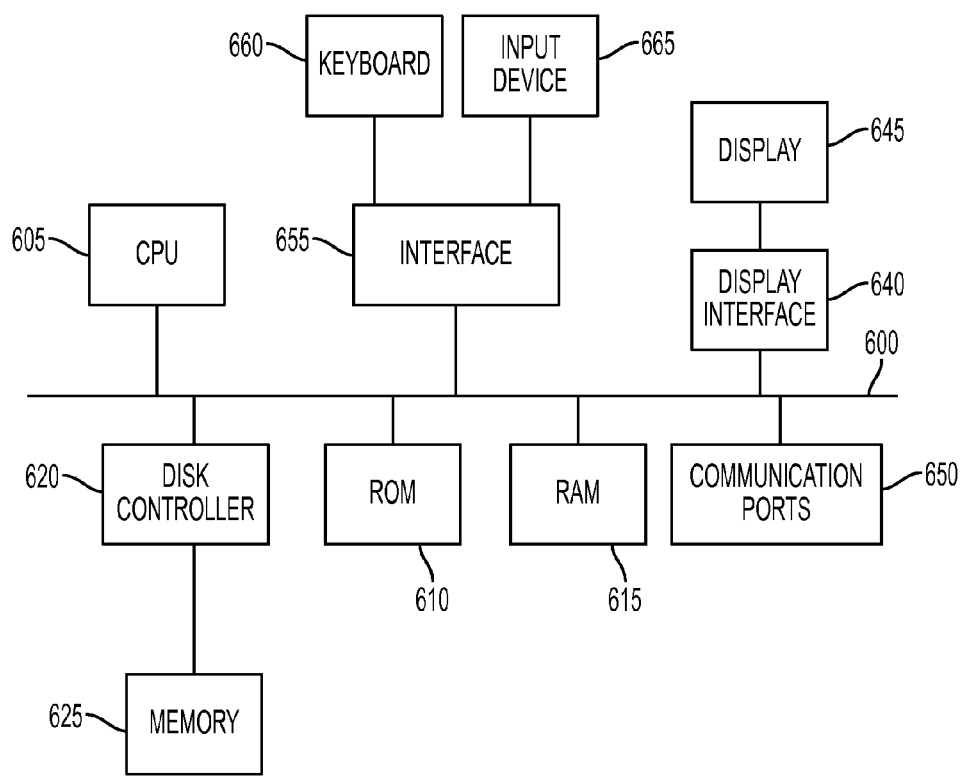
FIG. 3 depicts optional elements of a computing device that may be used with various embodiments of this disclosure.

FIG. 3 is a block diagram of hardware that may be used to contain or implement program instructions according to an embodiment. A bus 600 serves as the main information pathway interconnecting the other illustrated components of the hardware. CPU 605 is the central processing unit of the system, performing calculations and logic operations required to execute a program. Read only memory (ROM) 610 and random access memory (RAM) 615 constitute exemplary memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions may be stored in the ROM 610 and/or the RAM 615. Optionally, program instructions may be stored on a tangible computer readable storage medium such as a hard disk, compact disk, a digital disk, flash memory, a memory card, a USB drive, an optical disc storage medium, such as Blu-ray™ disc, and/or other recording medium.

An optional display interface 640 may permit information from the bus 600 to be displayed on the display 645 in audio, visual, graphic or alphanumeric format. Communication with external devices may occur using various communication ports 650. A communication port 650 may be attached to a communications network, such as the Internet or an intranet.

The hardware may also include an interface 655 which allows for receipt of data from input devices such as a keyboard 660 or other input device 665 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method, comprising:
storing customer data on a server of a cloud computing service that is located outside of a network security system of the customer;
by the cloud computing service provider, automatically monitoring the customer data to identify one or more access events, wherein each access event originates from a resource of the cloud computing service;
identifying for each access event a resource and a data set, wherein the resource comprises an identifier associated with a human operator or a software application that performed the access event, and the data set includes all customer data that the resource accessed during the access event;
by a processor of the cloud computing service provider, creating a report comprising each access event and information corresponding to the data set for each access event; and
causing the report to be transmitted to the customer.

2. The method of claim 1, further comprising:
identifying a time stamp for each access event;
including, in the report, for each access event the access event's identified time stamp; and
ensuring that the identified resource for each access event is not identified in the report.

3. The method of claim 1, further comprising:
identifying a portion of the data set is subject to a reporting restriction;
replacing the identified portion of the data set with a proxy;
including the proxy in the report; and
ensuring that the portion of the data set that is subject to the reporting restriction is not included in the report.

4. The method of claim 1, further comprising:
periodically generating updated reports; and
causing the updated reports to be transmitted to the customer.

5. The method of claim 1, wherein creating the report comprises:
determining for each access event a category that corresponds to the access event's data set;
grouping in the report the access events that share a common category.

6. The method of claim 1, wherein creating the report comprises, for each resource having an identifier that corresponds to a human operator,
assigning an anonymous identifier to the human operator;
determining whether the anonymous identifier corresponds to any other known identifier for the human operator, and if so modifying the anonymous identifier; and
referring in the report to the human operator only by the anonymous identifier.

7. The method of claim 1, wherein creating the report comprises, for each resource having an identifier that corresponds to a human operator:
determining a job category for the human operator; and
referring in the report to the human operator by the job category and not by any personally identifying information.

8. The method of claim 4, further comprising:
determining an access reason for each access event; and
including each determined reason in the report.

9. The method of claim 1, further comprising:
determining the information corresponding to the data set for each access event;
wherein the information corresponding to the data set for each access event comprises an identification of what was accessed, a time stamp, and a unique reference identifier.

10. The method claim 9, wherein the information corresponding to the access event also comprises one or more of:
an indication of how the data set was accessed,
a location from which the access request originated, or
a job category for a person who initiated the access request.

11. A method, comprising:
storing customer data on a server of a cloud computing service;
by the cloud computing service, identifying a plurality of access events, wherein each access event originates from a requesting resource of the cloud computing service;
identifying for each access event the originating resource, a timestamp, and a data set, wherein the data set identifies a portion of the customer data that the requesting resource accessed during the access event;
by the cloud computing service, creating a report comprising, for each access event, the access event's data set for each access event; and
by the cloud computing service, causing the report to be transmitted to a client.

12. The method of claim 11, further comprising, before causing the report to be transmitted to the client:
identifying a portion of the report that is subject to a reporting restriction;
replacing the identified portion of the report with a proxy;
including the proxy in the report; and
ensuring that the identified portion is not included in the report.

13. The method of claim 11, wherein creating the report comprises:
determining a category for each access event that corresponds to the access event's data set;
assigning each access event to the category for which its data set corresponds; and
grouping in the report the access events that share a common category.

14. The method of claim 11, further comprising:
determining an access reason for each access event; and
including each determined reason in the report.

15. The method of claim 11, further comprising:
determining the information corresponding to the data set for each access event;
wherein the information corresponding to the data set for each access event comprises:
an identification of what was accessed, a time stamp; and
a unique reference identifier, and
one or more of the following:
an indication of how the data set was accessed,
a location from which the access request originated, or
a job category for a person who initiated the access request.

16. The method of claim 11, wherein the requesting resources comprise one or more of the following: an e-mail application, a social networking applications, a document generation application, an audio or video media sharing application, or an audio or video media editing application.

17. A system, comprising:
a management server;
a storage facility; and
a plurality of resources that are affiliated with the management server;
wherein the management server includes a processor and a memory containing computer-readable programming instructions that, when executed, cause the management server to:
  receive customer data from an external client;
  store the customer data in the storage facility;
  identify an access event, wherein the access event comprises a grant of access to the customer data to a requesting one of the resources;
  identify the requesting resource, an access reason, a timestamp, and a data set, wherein the data set identifies a portion of the customer data that the requesting resource accessed during the access event;
  create a report comprising the access event's data set, the access reason, and information relating to the requesting resource; and
  cause the report to be transmitted to the external client.

18. The system of claim 17, wherein the requesting resource comprises an e-mail application, a social networking application, a document generation application, an audio or video media sharing application, or an audio or video media editing application.

19. The system of claim 17, wherein the programming instructions that, when executed, also cause the management server to perform the following before causing the report to be transmitted to the external client:
  identify a portion of the report that is subject to a reporting restriction;
  replace the identified portion of the report with a proxy;
  include the proxy in the report; and
  ensure that the identified portion is not included in the report.

20. The system of claim 17, wherein the programming instructions that, when executed, cause the management server to create the report also comprise instructions to:
  for each access event, determine a category that corresponds to the access event's data set; and
  in the report, group the access events that share a common category.

* * * * *